United States Patent
Eisenhardt et al.

(10) Patent No.: US 6,885,166 B2
(45) Date of Patent: Apr. 26, 2005

(54) REGULATING SYSTEM HAVING A SIMPLE HARDWARE UNIT FOR REGULATING AN ELECTRIC MACHINE OPTIONALLY IN PWM OPERATION OR BLOCK OPERATION

(75) Inventors: Martin Eisenhardt, Renningen (DE); Alexander Seufert, Markgroeningen (DE); Klaus Rechberger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/761,653

(22) Filed: Jan. 20, 2004

(65) Prior Publication Data

US 2004/0189241 A1 Sep. 30, 2004

(30) Foreign Application Priority Data

Jan. 20, 2003 (DE) .......................................... 103 01 826

(51) Int. Cl.[7] ................................................ H02P 5/34
(52) U.S. Cl. ....................... 318/811; 318/599; 318/720; 318/798; 318/434
(58) Field of Search ................................. 318/138, 254, 318/439, 811, 599, 434, 720–724, 798–802

(56) References Cited

U.S. PATENT DOCUMENTS

| | | | | |
|---|---|---|---|---|
| 5,689,169 A | * | 11/1997 | Kerkman et al. | 318/807 |
| 6,184,648 B1 | * | 2/2001 | Kato et al. | 318/811 |
| 6,456,030 B1 | * | 9/2002 | Masaki et al. | 318/700 |
| 6,639,379 B1 | * | 10/2003 | Matsushita et al. | 318/727 |
| 6,700,343 B1 | * | 3/2004 | Masaki et al. | 318/434 |

* cited by examiner

*Primary Examiner*—Rina Duda
(74) *Attorney, Agent, or Firm*—Kenyon & Kenyon

(57) ABSTRACT

A method and a device for regulating a polyphase machine, in particular a synchronous machine, in which a direct-axis voltage and a quadrature-axis voltage are determined as manipulated variables of the regulating system, and also including a pulse-width-modulation inverter which generates the phase voltages of the individual phases and is triggered to operate either in PWM mode or in block mode as a function of the operating mode of the electric machine. To simplify the hardware component of the regulating device, PWM control signals and block control signals are generated via software and sent to a PWM/block signal device as a function of the operating mode, the device being capable of generating either PWM signals or block signals as a triggering signal for the pulse-width-modulation inverter as a function of the control signal supplied.

12 Claims, 7 Drawing Sheets

```
TP_U    1   1   1   0   0   0

TP_V    0   0   1   1   1   0

TP_W    1   0   0   0   1   1
```

```
        1   1   1   0   0   0
        0   0   1   1   1   0
        1   0   0   0   1   1
-----------------------------
Z   |   0   1   2   3   4   5
```

REGULATING SYSTEM HAVING A SIMPLE HARDWARE UNIT FOR REGULATING AN ELECTRIC MACHINE OPTIONALLY IN PWM OPERATION OR BLOCK OPERATION

FIELD OF THE INVENTION

The present invention relates to a method and a device for regulating an electric machine, in particular a synchronous machine, in a field-oriented regulation.

BACKGROUND INFORMATION

In field-oriented regulation, a direct-axis voltage (Ud) and a quadrature-axis voltage (Uq) are determined as manipulated variables of the regulation system from the measured actual regulating value, such as the phase currents or phase voltages of a three-phase polyphase machine, taking into account predetermined setpoint values. Manipulated variables Ud, Uq are then usually converted into trigger pulses for a pulse-width-modulation inverter, which adjusts the sinusoidal phase voltages (U, V, W) of the electric machine. An electric machine is usually regulated at low rotational speeds in PWM operation (PWM=pulse width modulation) and at high rotational speeds in block operation.

A regulating device in which the type of triggering may be switched between PWM and block operation as a function of rotational speed is also known from the related art.

FIG. 1 shows such a regulating device with which switching between PWM operation and block operation is possible. The regulating device includes essentially a software component 1 and a hardware component 2, software 1 generating various control signals dcU, dcV, dcW, epsilon, which are sent to hardware 2. Hardware 2 generates from these signals PWM signals TP_X_PWM (X here stands for phases U, V, W) and block signals TP_X_block, which are sent to pulse-width-modulation inverter 12 at low and high rotational speeds n, respectively.

Specifically, software 1 includes a device 6 for field-oriented regulation, determining a direct-axis voltage Ud and a quadrature-axis voltage Uq as manipulated variables of engine regulation (in a Cartesian coordinate system) from the actual value of the regulated variables, e.g., the phase voltages or currents of electric machine 14, taking into account a predetermined setpoint (e.g., for a setpoint torque or a setpoint output voltage). Manipulated variables Ud, Uq are sent to a software unit 4, also referred to as an inverse Park transformer that transforms direct-axis voltage Ud and quadrature-axis voltage Uq into PWM control signals dcX (signal 20), which are sent to hardware 2, taking into account angular displacement alpha.

Software 1 also includes a unit 5 for generating a block control signal, namely a delay angle epsilon in the present case. Direct-axis voltage Ud and quadrature-axis voltage Uq are also sent to unit 5. The equation for calculating the delay angle is:

$$\text{epsilon} = \arctan\frac{Ud}{Uq}$$

In addition, software 1 also includes a device 7 for calculating the rotational speed, calculating a rotational speed n from the change in angular displacement alpha over time, this rotational speed n being sent to a device 3 for selecting a triggering mode. Triggering mode selector device 3 controls a switch device 11 implemented as hardware which permits switching between PWM operation and block operation.

Hardware 2 includes a PWM unit 8 for generating PWM signals which are sent to switch device 11. At its input, PWM unit 8 receives PWM control signals dcX from inverse Park transformer 4 and generates PWM signals from them.

Hardware 2 also includes a block switch mechanism 9 for generating block signals TP_X_block, which are also sent to switch device 11. At its input, block switch mechanism 9 receives delay angle epsilon, which is calculated by unit 5 and is switched directly by angular displacement alpha.

Switch device 11, at whose input PWM signals and block signals are both applied for triggering pulse-width-modulation inverter 12, is triggered by selector device 3, so that at low rotational speeds below a predetermined rotational speed threshold, PWM signals TP_X_PWM are switched through to pulse-width-modulation inverter 12, and at higher rotational speeds above the rotational speed threshold, block signals TP_X_block are switched through to pulse-width-modulation inverter 12.

FIG. 2 shows a simplified version of a typical example of a pulse-width-modulation inverter, only a portion of pulse-width-modulation inverter 12 being shown for a phase U. Pulse-width-modulation inverter 12 includes two series-connected switches 30, 31, e.g., MOS transistors triggered by a signal TP_U. Because of the inversion of signal TP_U in the lower branch of the configuration, switches 30, 31 operate in opposition. When closed, switch 30 pulls phase signal Ph_U to a positive intermediate voltage +Uzw (switch 31 is open in this state). However, when switch 31 is closed (switch 30 is open in this state), switch 31 pulls phase potential Ph_U to a negative intermediate voltage −Uzw. Switches 30, 31 are triggered either by PWM signals TP_U_PWM in PWM operation or by block signals TP_U_block in block operation.

Regulating device 1, 2 also includes a position sensor 13 from whose output signals B0, B1, B2 a device 10 determines angular displacement alpha.

In the regulating device illustrated in FIG. 1, PWM signals TP_X_PWM and block signals TP_X_block are generated by two separate hardware units 8 and 9, respectively. However, generation of PWM signals and block signals by different devices is relatively complex, because a special control unit having two such hardware units must be made available.

SUMMARY OF THE INVENTION

An object of the present invention is therefore to significantly simplify the hardware component of the regulating device.

An important idea of the present invention is to generate both PWM signals and block signals for a pulse-width-modulation inverter via a universal PWM/block signal device which receives either PWM control signals or block control signals, depending on the operating mode, and generates either a PWM signal or a block signal for a downstream pulse-width-modulation inverter accordingly. (The terms "PWM control signal" or "block control signal" used below are understood to refer to a signal which determines the switching flanks of the PWM signal or block signal. PWM signals and block signals, however, are signals which are used directly for triggering the transistors of the pulse-width-modulation inverter.) All the PWM control signals and block control signals are thus generated by the software component of the control device and are sent to the PWM/block signal device as a function of the operating mode. It is therefore possible to use a single unit to generate both PWM signals and block signals, preferably a hardware device, and to use software to generate the PWM control signals and block control signals. The choice of PWM control signals or block control signals to be relayed to the PWM/block signal device is preferably made by a switch device, also through the software.

A device for regulating a polyphase machine such as a permanent-field synchronous machine in a field-oriented regulation having a pulse-width-modulation inverter which generates the phase voltages of the individual phases of the electric machine includes according to the present invention at least the following:

a software unit for generating a PWM control signal, a software unit for generating a block control signal, a switch device which in a PWM mode selects the PWM control signal and in a block mode selects the block control signal and relays it to a PWM/block signal hardware device, and a PWM/block signal device which receives either the PWM control signal or the block control signal as a function of the operating mode and at its output generates either the PWM signal or the block signal.

The operating mode is determined, e.g., by the instantaneous rotational speed of the engine, but it may optionally also be determined by another variable, e.g., by a function of direct-axis voltage Ud and quadrature-axis voltage Uq.

The universal PWM/block signal device preferably includes a device for generating a periodic signal, e.g., a sawtooth voltage generator, and a comparator, which compares the PWM and/or block control signal supplied with the periodic signal. With the control signal supplied, the PWM/block signal device generates either the PWM signal or the block signal as a function of the operating mode on the basis of threshold value monitoring of the periodic signal.

The device for generating a periodic signal is preferably a sawtooth voltage generator. This reduces the computational complexity of the comparator in comparison with a delta signal generator.

The switching times for the block signal (i.e., the points in time at which a positive or negative switching flank occurs) are preferably determined by extrapolation of the electric phase angle for the particular phase, taking into account a variable derived from the rotational speed of the machine, e.g., the electric angular velocity of a phase. It is preferably determined here whether and where a switching operation of the block signal occurs between the instantaneous derived variable, e.g., the instantaneous electric phase angle of a phase (U, V, W) and the future derived variable, e.g., the future phase angle (at the next sampling point in time) of the phase (U, V, W). This may be performed easily through a software routine.

DETAILED DESCRIPTION

Figure 1:
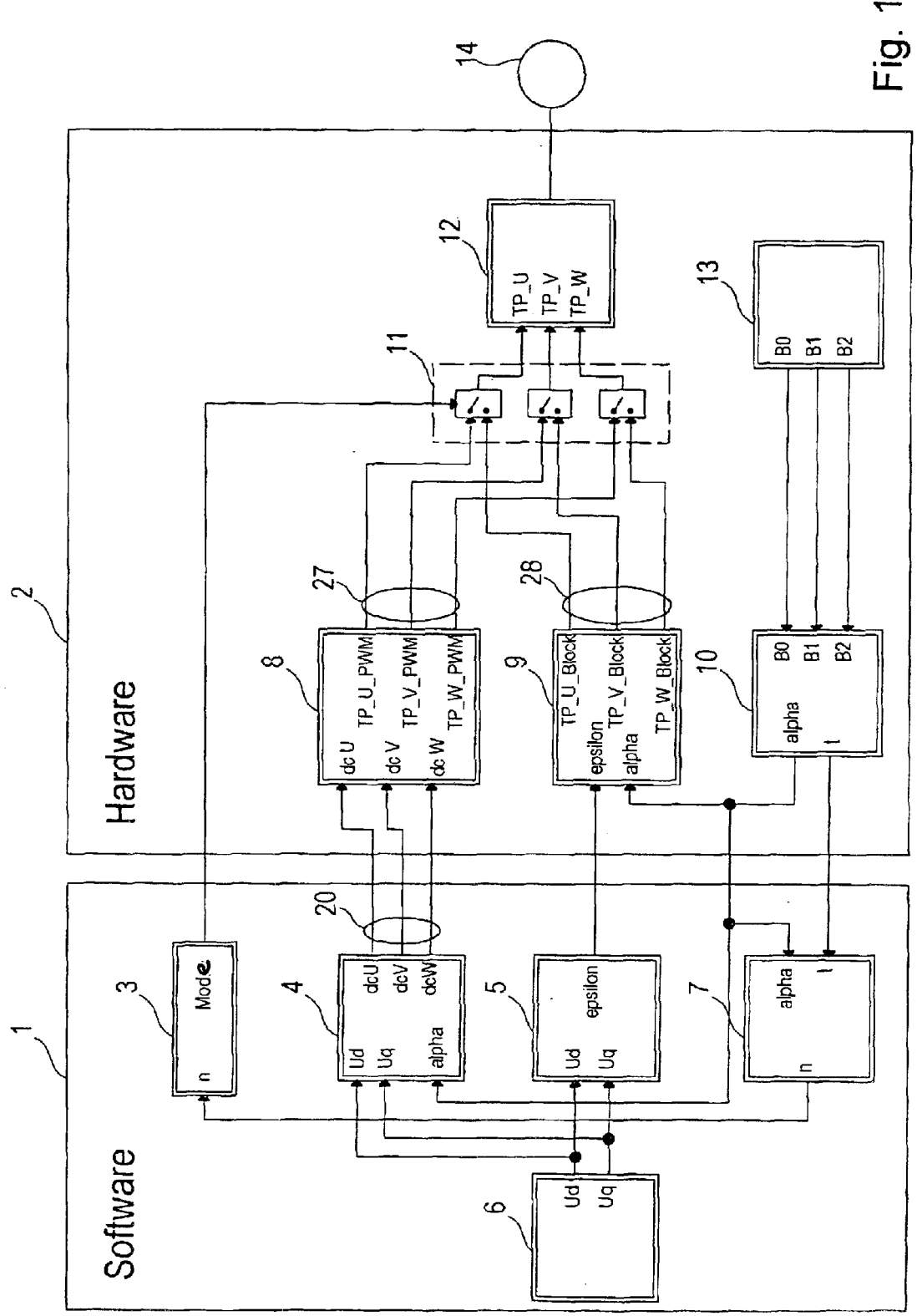
FIG. 1 shows a regulating device known from the related art for a three-phase synchronous machine.
Figure 2:
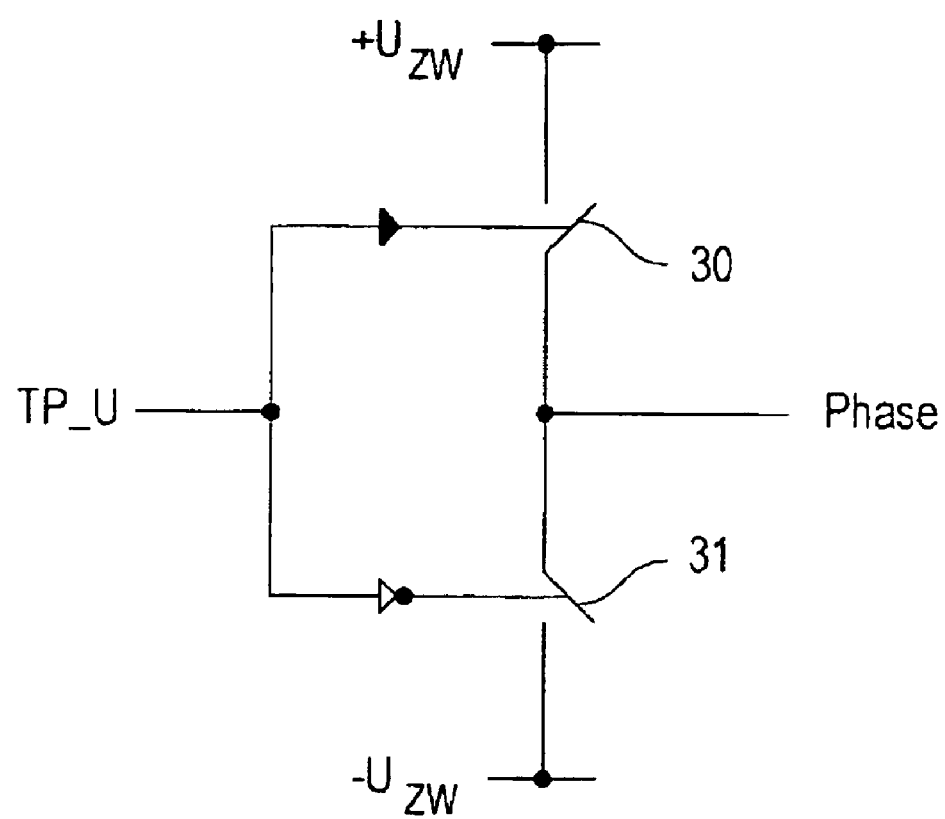
FIG. 2 shows a simplified diagram of part of a pulse-width-modulation inverter known from the related art.
Figure 3:
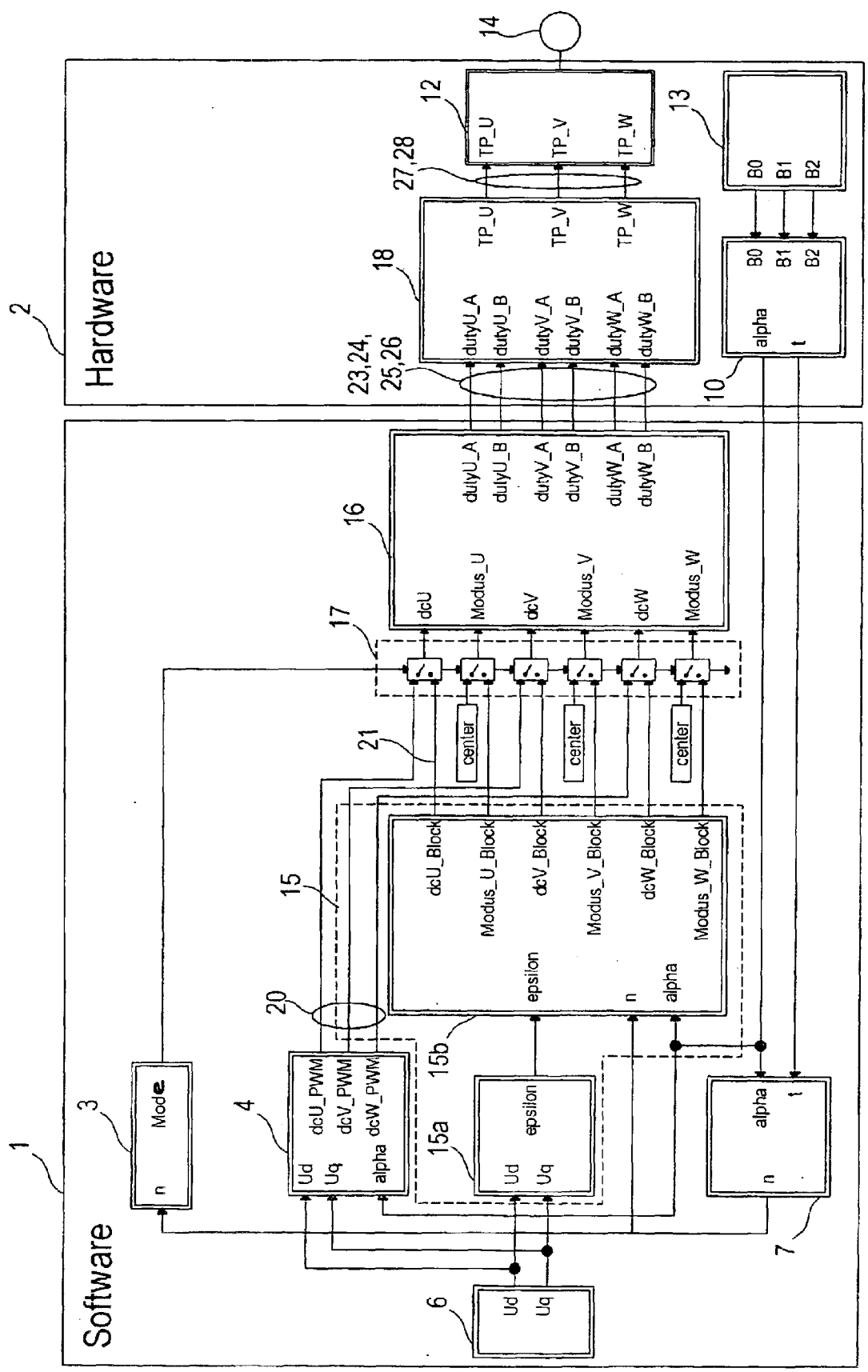
FIG. 3 shows a preferred embodiment of a regulating device according to the present invention.

FIG. 3 shows a regulating device for implementing a torque regulation for a three-phase synchronous machine such as that used as the starter generator in a motor vehicle, for example. The regulating device includes a software component 1 and a hardware component 2 and operates essentially according to the following principle:

Software 1 includes a regulator 6 for implementing a field-oriented regulation, receiving, for example, an onboard power voltage of an onboard power system (not shown) supplied by starter generator 14 as a regulated variable, and generating a direct-axis voltage Ud and a quadrature-axis voltage Uq (in the Cartesian coordinate system) as manipulated variables of the regulation, taking into account a setpoint torque. These manipulated variables are subsequently processed by the software and converted to control signals 20, 21 and/or 23–26 for a PWM/block signal device 18 implemented in the form of hardware.

PWM/block signal device 18 is capable of triggering a downstream pulse-width-modulation inverter 12, which generates phase voltages of individual phases U, V, W of electric machine 14, either in PWM operation or in block operation as a function of the control signals supplied. To do so, PWM/block signal device 18 generates either a PWM signal 27 or a block signal 28 at its output TP_X.

The decision between PWM operation and block operation is made by a mode selector device 3 of software 1. In the example presented here, the operating mode is determined by instantaneous rotational speed n of machine 14, but it may also be determined by another variable.

Software 1 includes a switch device 17 triggered by mode selector device 3, selecting PWM control signal 20 in PWM mode and selecting block control signal 21 in block mode and relaying the signal to PWM/block signal device 18. PWM/block signal device 18 thus generates either a PWM signal 27 or a block signal 28 at its outputs TP_X (X stands for individual phases U, V, W) as a function of control signals 23, 24 and/or 25, 26 received by software 1. Thus, only a single hardware device 18 is necessary for generating both PWM signals 27 and block signals 28.

Manipulated variables Ud and Uq are processed into control signals 23–26 for PWM/ block signal device 18 by various software units 4, 15 and 16. Software units 4, 15, 16, etc. may be program sections in particular. To generate PWM control signals 23, 24, first a PWM control signal 20 is calculated by an inverse Park transformer 4. Inverse Park transformer 4 receives input variables Ud, Uq and angular displacement alpha and calculates from them PWM control signal 20, which is output to outputs dcU_PWM, dcV_PWM, dcW_PWM. PWM control signal 20 is then sent to a conversion unit 16, which generates from PWM control signal 20 specific control signals 23, 24 for PWM/block signal device 18.

Figure 4:
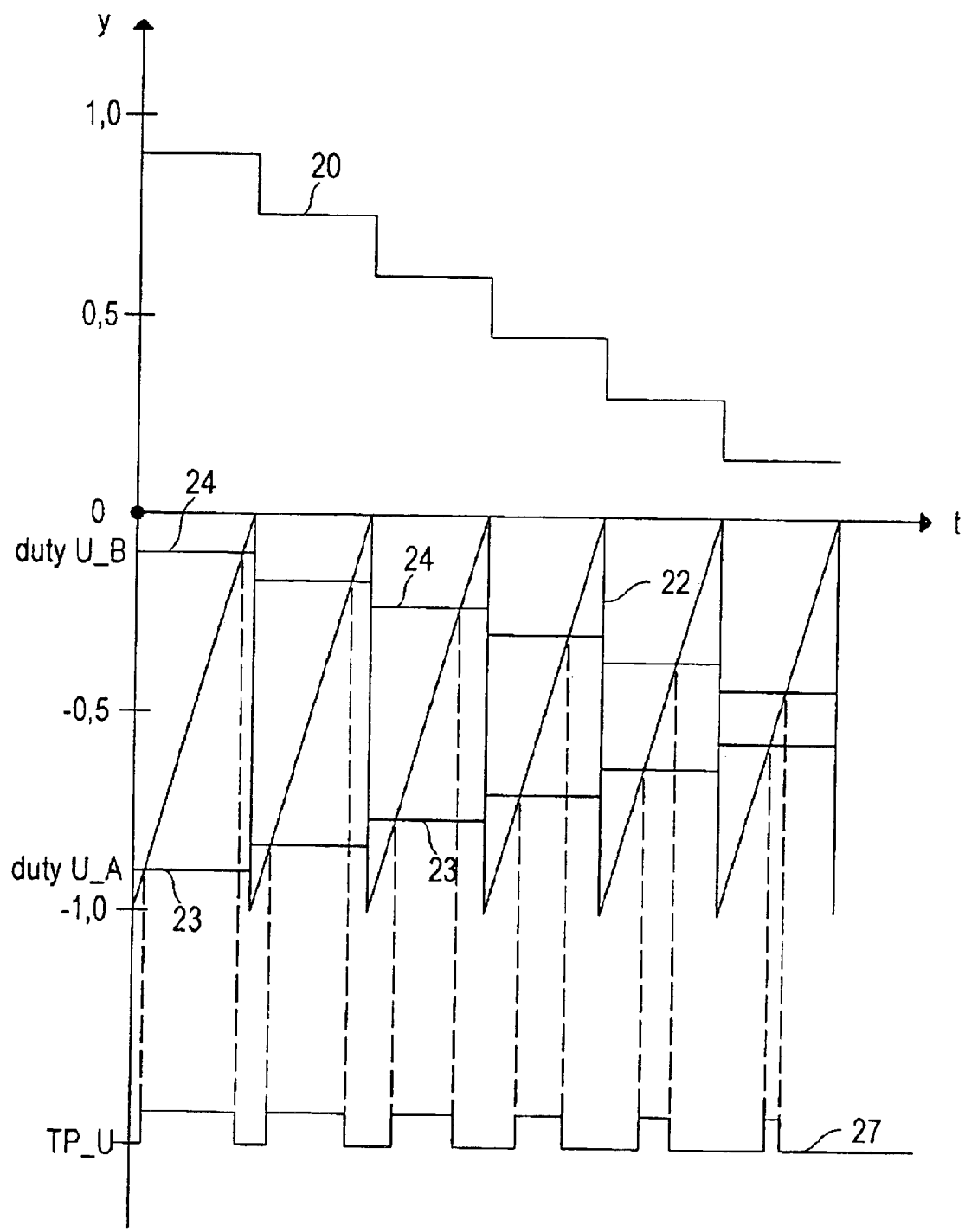
FIG. 4 shows a diagram of various control signals for generating a center-aligned PWM signal.

Software unit 16 calculates PWM control signals 23, 24 at a low rotational speed below a predetermined rotational speed threshold. These are switching thresholds for center-aligned PWM operation as depicted in FIG. 4. Control signals 23, 24 determine the switching points in time of PWM signals 27 output at output TP_X of PWM/block signal device 18.

FIG. 4 shows in the upper area as an example a PWM control signal 20 output by inverse Park transformer 4 for phase U. The central area of FIG. 4 shows PWM control signals 23, 24 which are output by conversion unit 16 in the case of PWM operation. PWM control signals 23, 24 output at outputs duty_X_A, duty_X_B for center-aligned PWM operation may be calculated by using the following equations:

duty_X_A=(dcX/2*counter$_{max}$)

duty_X_B=(counter$_{max}$−((dcX/2)*counter$_{max}$))

In these equations, the counter$_{max}$ value is equal to the maximum value of a counter, such as a sawtooth voltage generator generating signal 22. PWM control signals 23, 24 are then sent to PWM/block signal device 18, which has a sawtooth voltage generator 30 and a comparator 31 as shown in FIG. 6. Sawtooth voltage generator 30 outputs a sawtooth voltage signal 22 (see FIG. 5) which is compared by comparator 31 with PWM control signals 23, 24. If the reading on sawtooth voltage generator 30 exceeds the lower switching threshold predetermined by PWM control signal 23, then PWM/block signal device 18 generates a positive switching flank in signal 27. When upper switching threshold 24 is exceeded (see FIG. 4), PWM/block signal device 18 generates a negative switching flank (or vice versa). For example, PWM signal 27 depicted in FIG. 4 and generated in this way is used for triggering pulse-width-modulation inverter 12.

Figure 5:
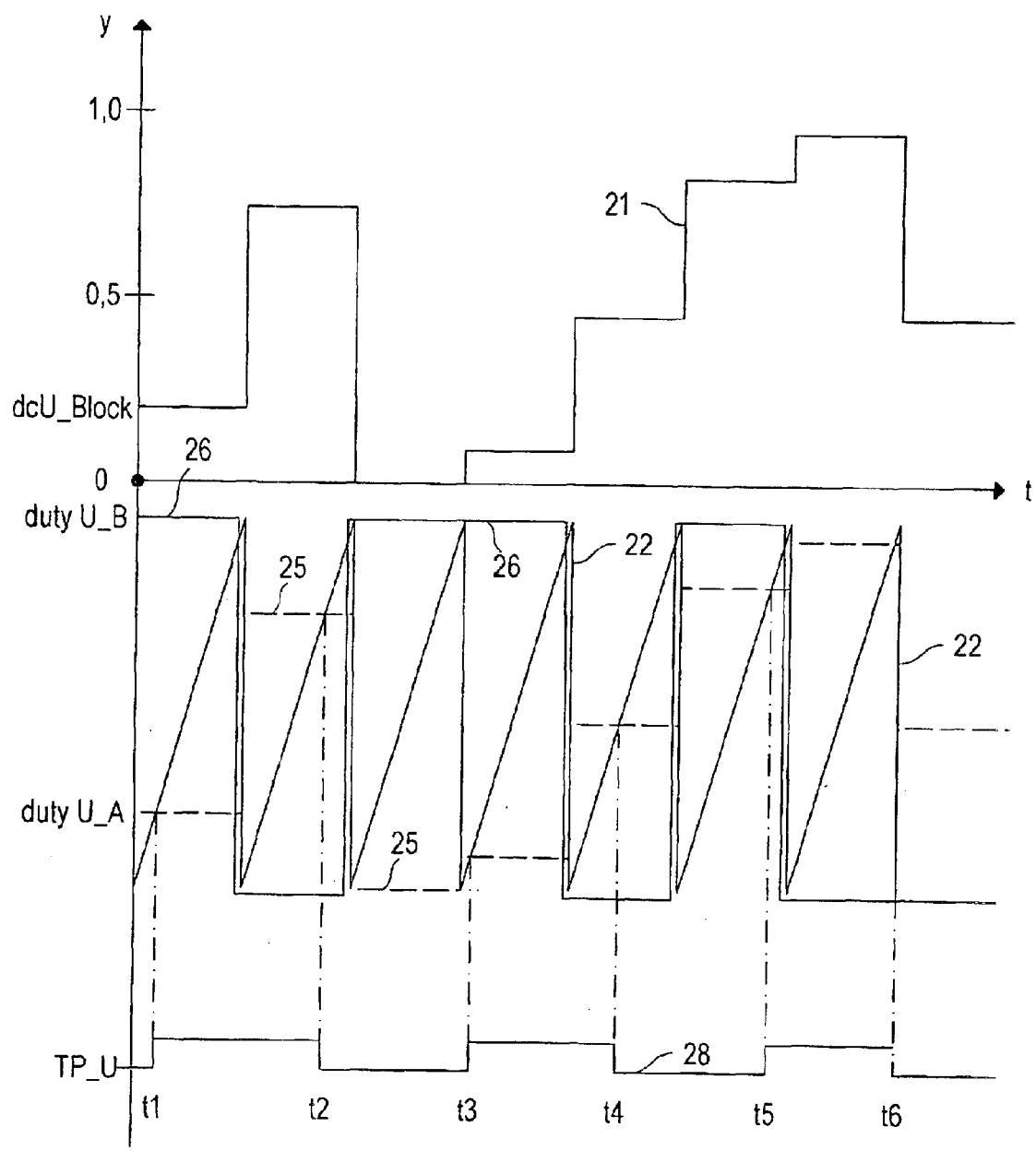
FIG. 5 shows a diagram of various control signals for generating a block signal.
Figure 6:
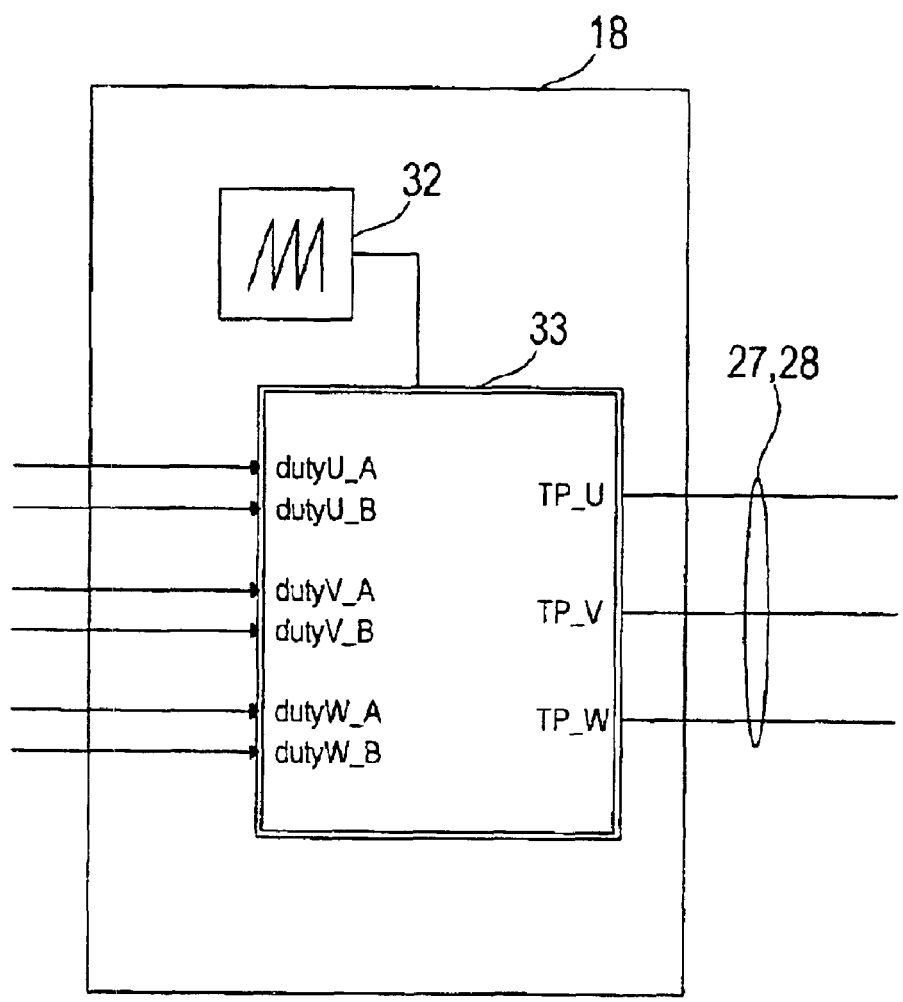
FIG. 6 shows an embodiment of a PWM/block signal device according to the present invention.

For the triggering of pulse-width-modulation inverter 12 in block operation according to FIG. 5, a device 15 for generating block control signals 21 is provided; it includes a device 15a for calculating a delay angle epsilon and a device 15b for calculating switching points in time ti of block signals 28. Delay angle computation unit 15a at first calculates delay angle epsilon from manipulated variables Ud, Uq, where $$\text{epsilon} = \arctan\frac{Ud}{Uq}.$$

Unit 15b for calculating switching points in time t1–t6 of block signal 28 (see FIG. 5) then calculates particular block control signal 21 for each individual phase U, V, W, taking into account delay angle epsilon, engine rotational speed n and angular displacement alpha. Unit 15b has inputs epsilon, n, alpha and outputs dcU_block, dcV_block and dcW_block and outputs mode U_block, mode V_block and mode W_block. Block control signals 21 are output at outputs dcX_block, and at outputs mode X_block a mode signal is output indicating to downstream conversion unit 16 that triggering is to take place in block operation.

Block control signals 21 (dcX_block) and thus also the switching threshold signals (i.e., control signals 25, 26) for block operation are preferably calculated by extrapolation of electric phase angle alpha$_x$. In a first step, an instantaneous electric phase angle, e.g., alpha$_U$ is calculated for phase U, and the following equation may be formulated, for example:

alpha$_U$=arctan(Uq/Ud)+alpha−90° where alpha is the mechanical angular displacement.

In the next step, electric phase angle alpha$_U$ is extrapolated, i.e., future phase angle alpha$_U$(t+dt) is calculated taking into account electric angular velocity omega$_{el}$ which would be established for a future point in time t+dt. (A sample value is picked up on each return of the sawtooth voltage generator, for example.) The future phase angle is given as follows:

alpha$_U$(t+dt)=alpha$_U$+omega$_{el}$dt.

Figures 7A, 7B, 8:
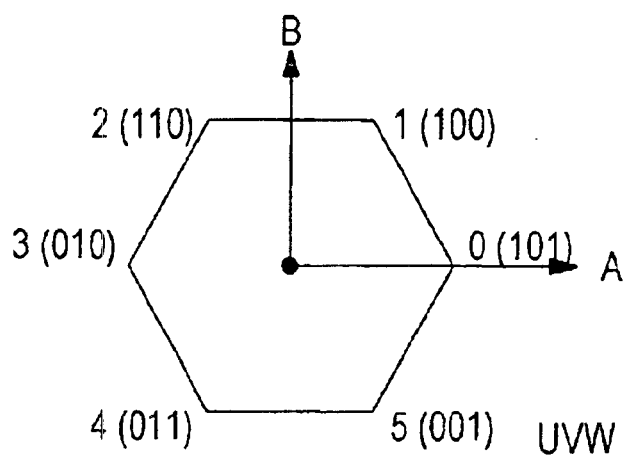
FIGS. 7a and 7b show various states of a block signal for a plurality of phases U, V, W.
FIG. 8 shows a space vector diagram which shows the various states of the block signal of individual phases U, V, W.

Then a determination is made as to whether a switching operation takes place in block signal 28 between these two sample values, and if so, where. Reference is made below to FIGS. 7a and 7b to explain the method for determining the switching points in time ti of block signal 28.

FIG. 7a shows the plot of block signals 28 at outputs TP_U, TP_V and TP_W of PWM/block signal device 18. As this shows, individual block signals 28 are each phase-shifted by 120°. When seen over all phases U, V, W, a total of six states may occur here as depicted in FIG. 7b. If the switch states of block signals TP_U, TP_V and TP_W are referred to as "logic 1" and "logic 0," this yields the combinations shown in FIG. 7b. On the whole, there are six switch states designated as 0–5. Switching from one state to the next occurs every 60° (electric phase angle).

The switch states may also be depicted by a vector diagram as shown in FIG. 8. The individual switch states here are labeled as 0–5.

As mentioned, to determine block control signals 21 and/or 25, 26, first it is necessary to determine whether a switching operation takes place in block signal 28 between two sample values, and if so, where. First, the value range of angle alpha$_X$ is restandardized from 0–2 pi to a value range of 0–6. In a next step, calculated angle alpha$_X$ is discretized. The discretization indicates in which of the 6 vector ranges, e.g., 0 . . . 5 angle alpha$_X$ is located.

By subtracting the current and future discrete angles, it is possible to determine how many switching operations there are between the instantaneous point in time (t) and the future point in time (t+dt). Subtraction yields, for example, a value:

0 for no switching operation up to the future sampling point in time (t+dt)

1 for switching to a phase U, V, W in the forward direction up to the future sampling point in time (t+dt) or −2 for switching to two phases U, V, W in the reverse direction until the future sampling point in time (t+dt).

Calculation of reversing points in time ti of block signal 28 is explained again below graphically. Assuming instantaneous electric phase angle alpha$_U$ for phase U is 50° (see FIG. 8), for example, and the value at the next sampling point in time t+dt is 70°, then in this example (at 60°) there is a switching operation from state 0 to state 1. This switching operation can be seen especially well in FIG. 7a, where block signal 28 of phase W switches from state "1" to state "0." Discretization of calculated angle alpha$_U$, alpha$_U$(t+dt) yields discrete state 1 for point in time t and discrete state 0 for point in time t+dt. Subtracting the instantaneous discrete angle from the future discrete angle thus yields −1.

On the basis of instantaneous angle alpha$_U$, it is possible to decide in which phase or phases a switching operation has taken place or will take place. In addition, it is possible to ascertain the percentage distance between instantaneous sampling point in time t and switching time based on the width of the sampling step. In the present example, the sampling increment is 20° (between 50° and 70°) and the switching time is alpha$_U$=60° (in steady-state operation, the switching times of block signals 28 are n*60°). The switching time in the present case is thus exactly in the middle of a sampling increment at 50% of maximum of sawtooth voltage signal 22. Block control signal 21 for phase W would thus have a value of 50%, for example.

Finally, conversion unit 16 calculates from block control signal 21 specific threshold value control signals 25, 26 for block operation, as depicted in FIG. 5.

Threshold value control signal 25 is a signal derived from block control signal 21, specifying the switching thresholds at times t1–t6 of block signal 28. Second switching threshold control signal 26 determines here the direction of the switching operation (positive or negative switching flank).

As mentioned previously, conversion unit 16 calculates specific PWM control signals 23, 24 for PWM operation at low rotational speeds and at high rotational speeds it calculates specific block control signals 25, 26 for block operation. For recognition of the operating mode, a mode signal, either the "center" mode signal for center-aligned PWM operation or the mode_X_block mode signal for block operation, is sent via a switch device 17 to conversion unit 16, switch device 17 selecting either "center" mode signal for PWM operation or mode_X_block mode signal for block operation as a function of rotational speed n. Switch device 17 at the same time relays to conversion unit 16 PWM control signals 20 supplied by inverse Park transformer 4 or block control signals 21 generated by unit 15, depending on the operating mode. Universal PWM block signal device 18 then generates a PWM signal 27 or a block signal 28 as a function of control signals 23–26 generated by conversion unit 16.

LIST OF REFERENCE NOTATION 1 software
2 hardware
3 unit for determining the triggering mode
4 inverse Park transformer
5 delay angle computation unit
6 regulating unit for field-oriented regulation
7 unit for rotational speed calculation
8 PWM unit
9 block switch mechanism
10 unit for determining the angular displacement
11 switch device
12 pulse-width-modulation inverter
13 position sensor
14 electric machine
15 unit for generating block control signals
15a delay angle computation unit
15b unit for determining switching points in time
16 conversion unit
17 switch device
18 PWM/block signal device
20 PWM control signal
21 block control signal
22 sawtooth voltage signal
23, 24 PWM switching threshold signals
25, 26 block switching threshold signals
27 PWM signal
28 block signal
30, 31 switch
32 sawtooth voltage generator
33 comparator
U, V, W phases
ti switching points in time

What is claimed is:

1. A device for regulating a polyphase machine in a field-oriented regulation in which a direct-axis voltage and a quadrature-axis voltage are determined as manipulated variables of a regulating system, the device comprising:
   a pulse-width-modulation inverter for generating phase voltages of individual phases, the inverter being triggered by one of (a) a PWM signal in PWM operation and (b) a block signal in block operation;
   a software device for generating a PWM control signal which determines switching points in time of the PWM signal;
   a software device for generating a block control signal which determines switching points in time of the block signal;
   a switch device which in a PWM mode selects the PWM control signal and in a block mode selects the block control signal; and
   a PWM/block signal device for receiving one of the PWM control signal and the block control signal relayed from the switch device, and for supplying one of the PWM signal and the block signal at an output.

2. The device according to claim 1, wherein the polyphase machine is a synchronous machine.

3. The device according to claim 1, wherein the PWM/block signal device includes a device for generating a periodic signal and a multiphase comparator.

4. The device according to claim 3, wherein the device for generating the periodic signal includes a sawtooth voltage generator.

5. The device according to claim 1, wherein the device for generating the PWM control signal, the device for generating the block control signal and the switch device are implemented as software.

6. The device according to claim 1, wherein the device for generating the block signal ascertains the block control signal by extrapolation of an electric phase angle, taking into account a variable derived from a rotational speed, and determines if and where a change in state of the block signal will occur between an instantaneous variable and an extrapolated variable.

7. The device according to claim 6, wherein the variable derived from the rotational speed is an electric angular velocity of a phase.

8. A method for regulating a polyphase machine in which a direct-axis voltage and a quadrature-axis voltage are determined as manipulated variables of a regulating system and are converted into one of a PWM signal and a block signal as a function of an operating mode, the converted signal being used to trigger a pulse-width-modulation inverter which generates phase voltages of individual phases, the method comprising:
   generating a PWM control signal which determines switching points in time of the PWM signal via a first software unit;
   generating a block control signal which determines switching points in time of the block signal via a second software unit;
   selecting one of the PWM control signal in a PWM mode and the block control signal in a block mode via a switch device; and
   sending one of (a) the selected control signal and (b) a signal derived from the selected control signal to a PWM/block signal device capable of generating one of the PWM signal and the block signal as a function of the signal supplied.

9. The method according to claim 8, wherein the polyphase machine is a synchronous machine.

10. The method according to claim 8, wherein the PWM/block signal device includes a device for generating a periodic signal and a multiphase comparator, the signal supplied being compared with the periodic signal.

11. The method according to claim 8, wherein one of the PWM control signal and the block control signal is selected by the switch device and is relayed to a conversion device which calculates from one of the PWM control signal and the block control signal a modified control signal tuned to the PWM/block signal device and relays the modified control signal to the PWM/block signal device.

12. The method according to claim 8, wherein one of the PWM control signal and the block control signal is selected by the switch device and is relayed directly to a pulse-width-modulation inverter.

* * * * *